United States Patent
Awatani et al.

(10) Patent No.: US 9,544,518 B2
(45) Date of Patent: Jan. 10, 2017

(54) IMAGE PICKUP APPARATUS AND IMAGE PICKUP SYSTEM WITH AD CONVERTER OUTPUTTING IMAGE DATA AT FIRST RESOLUTION IN A CASE WHERE PIXEL SIGNALS ARE NOT HIGHER THAN THRESHOLD LEVEL AND AT SECOND RESOLUTION IN A CASE WHERE PIXEL SIGNALS ARE HIGHER THAN THRESHOLD LEVEL

(71) Applicant: CANON KABUSHIKI KAISHA, Tokyo (JP)

(72) Inventors: Yoshio Awatani, Kawasaki (JP); Kazuhiro Namiki, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 13 days.

(21) Appl. No.: 14/565,656

(22) Filed: Dec. 10, 2014

(65) Prior Publication Data
US 2015/0181149 A1    Jun. 25, 2015

(30) Foreign Application Priority Data
Dec. 19, 2013    (JP) .................................. 2013-262477

(51) Int. Cl.
| | | |
|---|---|---|
| H03M 1/12 | (2006.01) | |
| H04N 5/228 | (2006.01) | |
| H04N 5/235 | (2006.01) | |
| H04N 5/335 | (2011.01) | |
| H04N 3/14 | (2006.01) | |
| H04N 5/3745 | (2011.01) | |
| H04N 5/378 | (2011.01) | |
| H04N 5/232 | (2006.01) | |

(52) U.S. Cl.
CPC ...... *H04N 5/37455* (2013.01); *H04N 5/23245* (2013.01); *H04N 5/378* (2013.01); *H04N 5/37457* (2013.01); *H04N 5/23241* (2013.01)

(58) Field of Classification Search
CPC ........... G05B 2219/21137; G05B 2219/35561; G05B 2219/21124; G02F 7/00
USPC .................... 348/222.1, 229.1, 572, 294–302
See application file for complete search history.

(56) References Cited

U.S. PATENT DOCUMENTS

| 8,800,874 | B2 * | 8/2014 | Gao | ................... G06K 7/10722 235/454 |
|---|---|---|---|---|
| 2002/0054219 | A1 * | 5/2002 | Jaspers | .................. H04N 9/045 348/222.1 |
| 2004/0189843 | A1 * | 9/2004 | Holberg | ............. H04N 5/23241 348/294 |

(Continued)

FOREIGN PATENT DOCUMENTS

| JP | 2005-348325 A | 12/2005 |
|---|---|---|
| JP | 4928069 B2 | 5/2012 |

*Primary Examiner* — Chia-Wei A Chen
(74) *Attorney, Agent, or Firm* — Fitzpatrick, Cella, Harper & Scinto

(57) ABSTRACT

An image pickup apparatus includes a plurality of pixels, a readout circuit configured to read out pixel signals from the pixels for each pixel row, an analog to digital (AD) converter configured to adjust an AD conversion gain depending on an output level of the readout circuit and to provide a signal from the readout circuit with an AD conversion to output image data, and a controller configured to control the AD conversion gain of the AD converter depending on a predetermined condition.

11 Claims, 12 Drawing Sheets

(56) References Cited

U.S. PATENT DOCUMENTS

| | | | |
|---|---|---|---|
| 2004/0239790 A1* | 12/2004 | Maeda | H04N 5/23245 348/311 |
| 2006/0012698 A1* | 1/2006 | Nitta | H04N 5/335 348/308 |
| 2006/0013485 A1* | 1/2006 | Nitta | G06K 9/60 382/194 |
| 2006/0221230 A1* | 10/2006 | Dutta | H04M 1/72522 348/376 |
| 2008/0074513 A1* | 3/2008 | Noguchi | H04N 5/361 348/243 |
| 2008/0170136 A1* | 7/2008 | Raynor | H04N 5/357 348/241 |
| 2009/0002527 A1* | 1/2009 | Higuchi | H03M 1/0604 348/243 |
| 2009/0040339 A1* | 2/2009 | Lee | H04N 5/23212 348/231.2 |
| 2009/0066816 A1* | 3/2009 | Wakagi | H04N 5/20 348/234 |
| 2009/0129153 A1* | 5/2009 | Sarin | G11C 11/5628 365/185.03 |
| 2009/0225211 A1* | 9/2009 | Oike | H03M 1/1023 348/308 |
| 2009/0310001 A1* | 12/2009 | Masuyama | H04N 5/378 348/300 |
| 2010/0110216 A1* | 5/2010 | Nishihara | H04N 5/341 348/222.1 |
| 2011/0114827 A1* | 5/2011 | Yamaoka | H03K 4/026 250/214 R |
| 2013/0027595 A1* | 1/2013 | Hashizume | H03M 1/007 348/302 |
| 2013/0088624 A1* | 4/2013 | Mo | H04N 5/355 348/300 |
| 2013/0169775 A1* | 7/2013 | Ono | A61B 1/00009 348/68 |
| 2013/0229486 A1* | 9/2013 | Molnar | G06T 1/0007 348/43 |
| 2014/0077986 A1* | 3/2014 | Huang | H03M 1/687 341/172 |
| 2014/0118583 A1* | 5/2014 | Shida | H04N 5/3765 348/250 |
| 2014/0293107 A1* | 10/2014 | Nishihara | H01L 27/14603 348/308 |
| 2015/0130971 A1* | 5/2015 | Oike | H03M 1/186 348/241 |

* cited by examiner

IMAGE PICKUP APPARATUS AND IMAGE PICKUP SYSTEM WITH AD CONVERTER OUTPUTTING IMAGE DATA AT FIRST RESOLUTION IN A CASE WHERE PIXEL SIGNALS ARE NOT HIGHER THAN THRESHOLD LEVEL AND AT SECOND RESOLUTION IN A CASE WHERE PIXEL SIGNALS ARE HIGHER THAN THRESHOLD LEVEL

BACKGROUND OF THE INVENTION

Field of the Invention

The present invention relates to an image pickup apparatus including an AD (analog to digital) converter.

Description of the Related Art

The readout speed of an image pickup apparatus (solid-state image pickup apparatus) has been required to be increased. This is because a fast readout speed of the image pickup apparatus can increase the number of pixels to be read and improve a readout frame rate. To increase the readout speed of the image pickup apparatus, an AD (analog to digital) converter included in the image pickup apparatus, in particular, is required to be speeded up.

Japanese Patent No. 4928069 discloses an image pickup apparatus including an AD converter in each readout row of a pixel portion.

With a configuration disclosed in Japanese Patent No. 4928069, a fast multi-bit AD conversion is effectively performed by increasing a clock frequency supplied to the AD converter, thereby shortening a time needed for the AD conversion. However, a higher clock frequency results in an increased power consumption of the image pickup apparatus.

SUMMARY OF THE INVENTION

The present invention provides an image pickup apparatus and an image pickup system that are fast and have low power consumption.

An image pickup apparatus as one aspect of the present invention includes a plurality of pixels, a readout circuit configured to read out pixel signals from the pixels for each pixel row, an analog to digital (AD) converter configured to adjust a AD conversion gain depending on output level of the readout circuit and to provide a signal from the readout circuit with an AD conversion to output image data, and a controller configured to control the AD conversion gain of the AD converter depending on a predetermined condition.

An image pickup system as another aspect of the present invention includes the image pickup apparatus and an image processing apparatus configured to control the image pickup apparatus.

Further features and aspects of the present invention will become apparent from the following description of exemplary embodiments with reference to the attached drawings.

DESCRIPTION OF THE EMBODIMENTS

Figure 1:
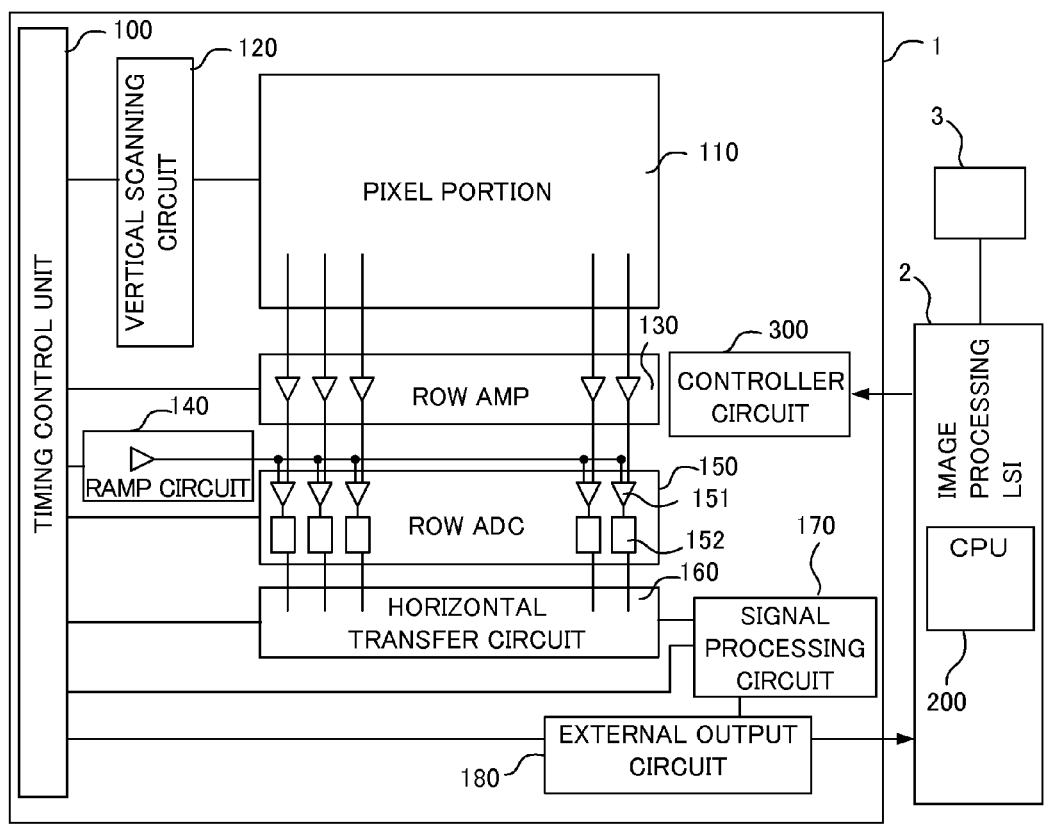
FIG. 1 is a block diagram of an image pickup apparatus in Embodiment 1 of the present invention.

Exemplary embodiments of the present invention will be described below with reference to the accompanied drawings. In each of the drawings, the same elements will be denoted by the same reference numerals and the duplicate descriptions thereof will be omitted.

Embodiment 1

First, referring to FIG. 1, a configuration of an image pickup apparatus in Embodiment 1 of the present invention will be described. FIG. 1 is a block diagram of an image pickup apparatus 1 in the present embodiment. The image pickup apparatus 1 is a solid-state image pickup apparatus (CMOS image sensor) mounted with an analog to digital (AD) converter (parallel AD converter).

In FIG. 1, reference numeral 2 denotes an image processing LSI (image processing apparatus). The image processing LSI 2 provides image data (image signal) output from the image pickup apparatus 1 with image processing (development processing) such as white balance processing, gamma processing, and demosaicing processing, and records processed image data in a recording medium 3. The image processing LSI 2 includes a temperature sensor (not illustrated) that detects a temperature inside a camera including the image pickup apparatus 1 and the image processing LSI 2. The image processing LSI 2 includes a built-in CPU 200 (control apparatus). The CPU 200 controls an operation mode of the camera such as a record mode, a play mode, and a standby mode. The CPU 200 controls operation of the image pickup apparatus 1 depending on an image capturing frame rate. The CPU 200 changes a characteristic (for example, a gamma curve LUT) of the gamma processing at image recording.

The image pickup apparatus 1 includes a pixel portion 110, a vertical scanning circuit 120, a row amplifier (row AMP) 130, a ramp circuit 140, a row AD converter (row ADC) 150, a horizontal transfer circuit 160, a signal processing circuit 170, an external output circuit 180, and a controller circuit 300. The controller circuit 300 is an interface unit (I/F unit) to the image processing LSI 2 and receives a control signal to the image pickup apparatus 1 output from the CPU 200 of the image processing LSI 2 through, for example, a serial communication unit.

The pixel portion 110 includes a plurality of photoelectric conversion elements (pixels) that each convert photons into electric charges depending on an incident light intensity and output the electric charges as a voltage. Such a configuration allows the pixel portion 110 to provide an object image (optical image) with a photoelectric conversion and to output image signals. The pixel portion 110 will be described in detail later. A timing control unit 100 (controller) supplies each block of the image pickup apparatus 1 with an operation clock (operation CLK) and also supplies the block with a timing signal so as to control operation of the block. The vertical scanning circuit 120 performs timing control to sequentially read out, in one frame, pixel signal voltages of the pixel portion 110 including two-dimensionally arranged pixels. Typically, the image signals (video signals) are sequentially read out row by row in order from an upper row to a lower row within one frame.

The row amplifier 130 electrically amplifies a readout signal from the pixel portion 110. The row amplifier 130 amplifies a level of this pixel signal relative to noise from the ramp circuit 140 and the row ADC 150 at subsequent stages, which equivalently leads to an improved SN ratio. Incidentally, such a circuit structure in which the noise from the ramp circuit 140 and the row ADC 150 is sufficiently less than noise from the pixel portion 110 does not requires the row amplifier 130. The ramp circuit 140 is a signal generating unit that generates a ramp shaped voltage signal (ramp signal) having a constant slope (ramp) in a time direction.

The row ADC 150 (AD converter) adjusts an AD conversion gain depending on an output level of the pixel portion 110 (a readout circuit) and provides the signal from the readout circuit with an AD conversion so as to output image data. The AD conversion gain of the row ADC 150 is controlled by the timing control unit 100 depending on a predetermined condition. The row ADC 150 includes a comparison unit 151 that compares the readout signal from the row amplifier 130 and the signal from the ramp circuit 140. The row ADC 150 includes a counter-latch circuit 152 and performs a counting operation in a specified duration (predetermined duration) depending on an output from the comparison unit 151. This counting operation yields a count value proportional to a level of the readout signal from the row amplifier 130, and this count value is output an AD conversion result. This operation will be described in detail later. The counter-latch circuit 152 latches (holds) the count value. Image data per row held in the counter-latch circuit 152 is sequentially read out by the horizontal transfer circuit 160 in order from pixel data at an edge.

An output from the horizontal transfer circuit 160 is input to the signal processing circuit 170. The signal processing circuit 170 is a circuit that performs digital signal processing in which a constant offset value is digitally added to the output. The signal processing circuit 170 performs a shift operation and multiplication, thereby performing a simple gain calculation. The signal processing circuit 170 may include a pixel region shielded from light in the pixel portion 110, which is used to perform a digital black level clamp operation.

An output from the signal processing circuit 170 is input to the external output circuit 180. The external output circuit 180 has a serializing function and converts a multi-bit input parallel signal from the signal processing circuit 170 into a serial signal. The external output circuit 180 converts this serial signal into, for example, an LVDS signal, and communicates image information with an external device (in the present embodiment, the image processing LSI 2).

Figure 2:
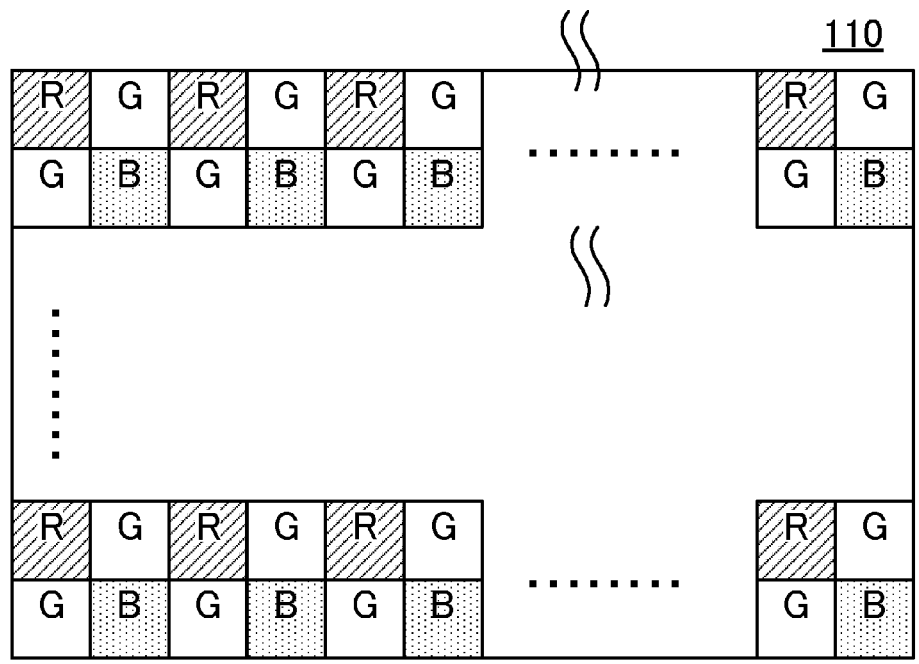
FIG. 2 is a configuration diagram of a pixel portion in Embodiment 1.

Next, referring to FIG. 2, a configuration of the pixel portion 110 of the image pickup apparatus 1 in the present embodiment will be described. FIG. 2 is a configuration diagram of the pixel portion 110. The pixel portion 110 includes a plurality of pixels (a plurality of photoelectric conversion elements), and a color filter and a micro lens are mounted on a surface of each photoelectric conversion element (photodiode; PD). In the present embodiment, three color filters of red (R), green (G), and blue (B) are used to construct a Bayer array periodic structure of what are called RGB primary color filters.

Figure 3:
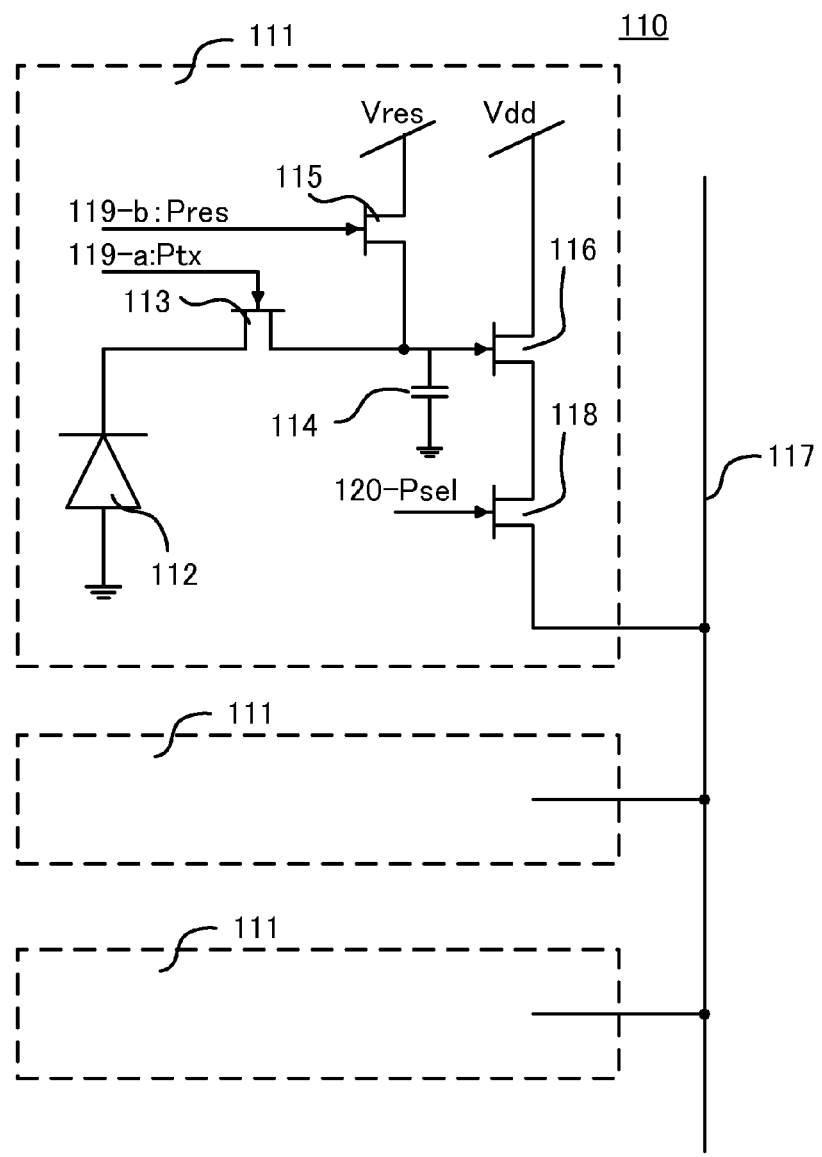
FIG. 3 is a circuit configuration diagram of a unit pixel in Embodiment 1.

Next, referring to FIG. 3, a circuit configuration of a unit pixel portion 111 (readout circuit) included in the pixel portion 110 will be described. FIG. 3 is a circuit configuration diagram of the unit pixel portion 111 and illustrates an example of the readout circuit for reading out an electric signal from the unit pixel portion 111. The readout circuit in the present embodiment is configured to read out pixel signals from the pixels for each pixel row.

A photodiode (PD) 112 is a photoelectric conversion element that accumulates electric charges depending on an incident light intensity. A transfer transistor (Ptx-Tr) 113 serves as a switch for transferring the electric charges accumulated in the PD 112 to a floating diffusion (FD) 114. When a transfer control line (Ptx) 119-$a$ is set to a high level, the electric charges move from the PD 112 to the FD 114. The FD 114 is a capacitor and converts the electric charges into a voltage.

A reset transistor (RST-Tr) 115 is a transistor for resetting the FD 114 by a pulse through a reset control line (Pres) 119-$b$. The Ptx-Tr 113 resets a level of the FD 114 to a reset level (Vres) before the electric charges are transferred from the PD 112 to the FD 114. Then, the reset is released, and a difference between a level (N level) of the FD 114 before the Ptx-Tr 113 is switched on and a level (S level) of the FD 114 after the Ptx-Tr 113 is switched on and the electric charges move from the PD 112 to the FD 114 is obtained through signal processing later. This difference is used as a video signal proportional to a light quantity. In this operation, a larger light quantity incident on the PD 112 after the level of the FD 114 is reset to the reset level (Vres) leads to an increased amount of the electric charges read out from the PD 112 and to a smaller voltage of the FD 114. Thus, when an image of a brighter object is captured, the level of the FD 114 is smaller than the Vre level.

A source follower transistor (SF-Tr) 116 is a driver circuit for passing the voltage of the FD 114 to a circuit at a later stage. A vertical readout line 117 is connected to an input terminal of the row AMP 130 and is shared by a plurality of pixels arranged in a row direction. The vertical readout line 117 controls a select transistor (SEL-Tr) 118 to cut off the SF-Tr 116 of pixels other than a target pixel from the vertical readout line 117, thereby selectively reading out pixels. The SEL-Tr 118 is controlled through a 120-Psel signal in FIG. 3.

Figure 4:
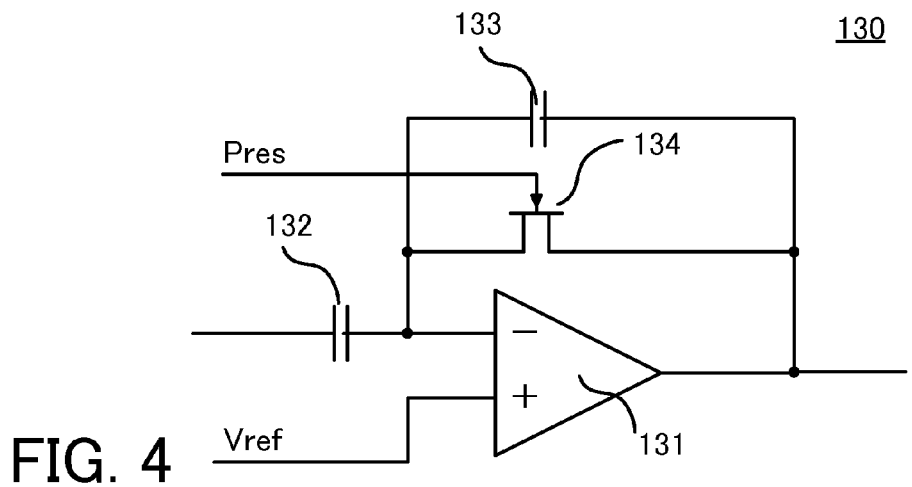
FIG. 4 is a circuit configuration diagram of a row AMP in Embodiment 1.

Next, referring to FIG. 4, a circuit configuration of the row AMP 130 of the present embodiment will be described. FIG. 4 is a circuit configuration diagram of the row AMP 130. The row AMP 130 includes an amplifier 131 (AMP), a Cin capacitor 132, a Cfb capacitor 133, and a RST-SW 134. A reference voltage (Vref) is applied to a plus (+) terminal of the AMP 131.

In a duration when the FD 114 is reset by the RST-Tr 115, the RST-SW 134 is turned on to reset electric charges accumulated in the Cfb capacitor 133. Subsequently, the Rst-SW 134 is turned off to cause the row AMP 130 to function as an amplification amplifier that amplifies a voltage applied to an input terminal of the Cin 132 to a voltage level amplified at a capacitance ratio of the Cin capacitor 132 and the Cfb capacitor 133 at an output terminal of the AMP 131.

In practice, when the Pres 119-b is set to a low level to release the reset of the FD 114, the Rst-SW 134 is turned off. This stores reset noise generated by resetting the FD 114 in the Cin 132. This reset noise, which is superimposed on both results of an N conversion and an S conversion at an AD conversion described later, can be removed through a CDS operation (calculation of the S conversion result minus the N conversion result) described later.

In the N conversion, the N level (reset level before the Ptx-Tr 113 conducts) of a selected pixel is set to the input terminal of the Cin 132 through the vertical readout line 117. Thus, the row AMP 130 outputs a voltage obtained by amplifying the N level. The N level is then provided with the AD conversion by a row ADC circuit 150 described later. In the present embodiment, a result of this AD conversion is referred to as N-AD.

Next, the Ptx 119-a is set to the high level and the Ptx-Tr 113 conducts, and then a voltage depending on an accumulated light quantity is input to the input terminal of the Cin 132 through the vertical readout ine 117. Thus, the row AMP 130 outputs the S level. The S level is provided with the AD conversion through the row ADC circuit 150 described later. In the present embodiment, a result of this AD conversion is referred to as S-AD.

Figure 5A:
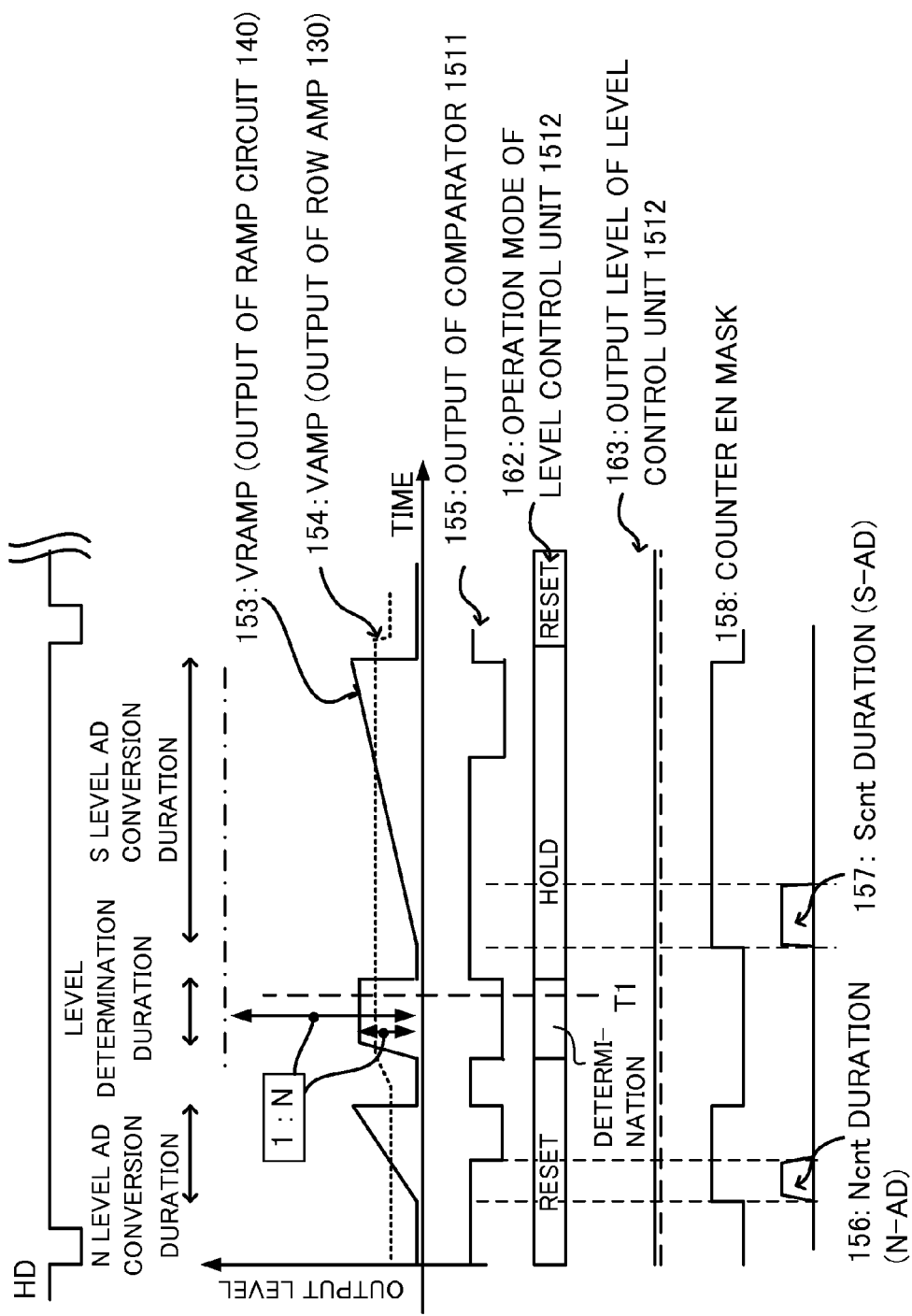
FIG. 5A illustrates an operation of a row ADC in Embodiment 1.
Figure 5B:
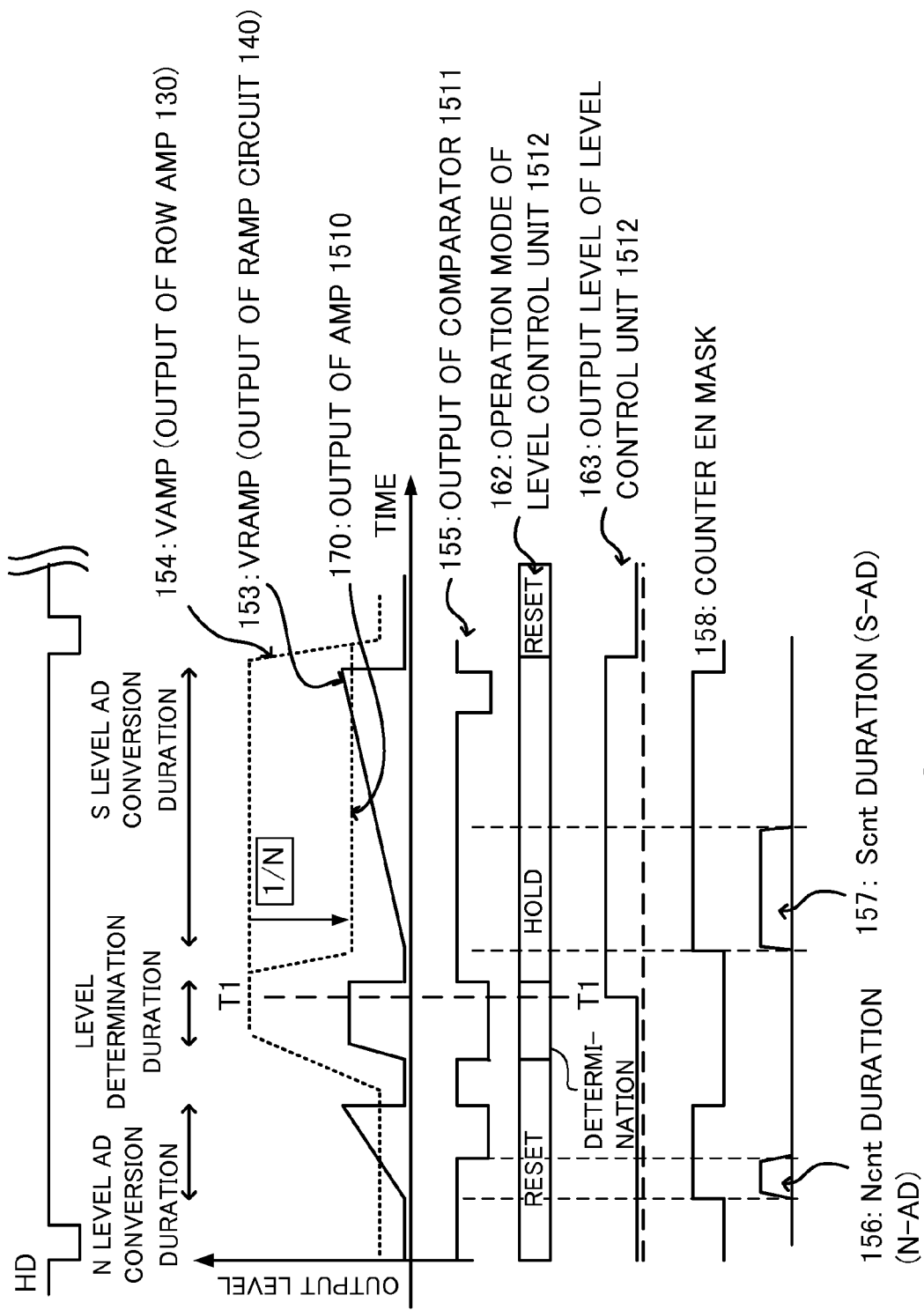
FIG. 5B illustrates the operation of the row ADC in Embodiment 1.
Figure 6:
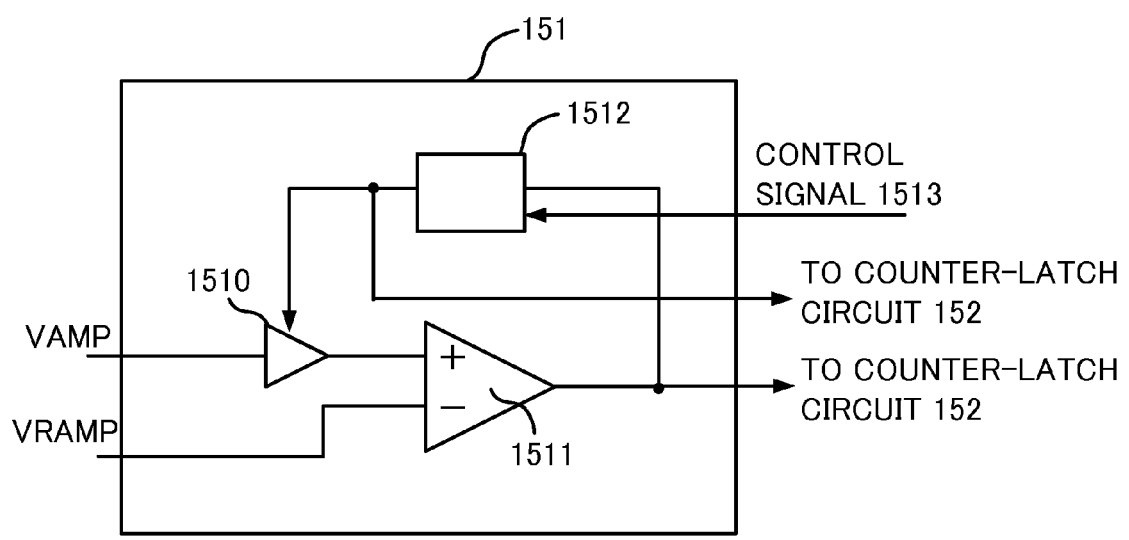
FIG. 6 is a circuit configuration diagram of a comparison unit in Embodiment 1.

Next, referring to FIGS. 5A, 5B, and 6, the row ADC 150 will be described. FIGS. 5A and 5B illustrate a temporal flow of an operation of the row ADC 150. FIG. 6 is a circuit configuration diagram of the comparison unit 151 provided to the row ADC 150.

In FIG. 6, reference numeral 1510 denotes an amplifier (AMP), reference numeral 1511 denotes a comparator, and reference numeral 1512 denotes a level control unit. The level control unit 1512 receives a control signal 1513 provided from outside the comparison unit 151 (in the present embodiment, a control signal provided from the timing control unit 100 in FIG. 1), and an output signal of the comparator 1511. The AMP 1510 is controlled based on an output signal of the level control unit 1512. The AMP 1510 has its gain also controlled based on the output signal of the level control unit 1512.

FIG. 5A is an explanatory diagram of the operation of the row ADC 150 (comparison unit 151). A minus terminal of the comparison unit 151, that is, the comparator 1511 receives a ramp voltage (VRAMP 153) generated by the ramp circuit 140. On the other hand, a plus terminal of the comparator 1511 receives a signal obtained by amplifying an output (VAMP 154) of the row AMP 130 through the AMP 1510. In FIG. 5A, reference numeral 162 denotes an operation mode of the level control unit 1512, and reference numeral 163 denotes an output level of the level control unit 1512 (a control level of the AMP 1510).

In an N conversion duration (N level AD conversion duration) in FIG. 5A, the control signal 1513 provides a reset control to the level control unit 1512. In this control, the output level of the level control unit 1512 is set to a low level. The AMP 1510 is set to a gain of unity, when the output level of the level control unit 1512 is at the low level. The comparator 1511 compares an output of the AMP 1510 and the ramp voltage (VRAMP). The row ADC 150 includes a count-up counter that counts time until an output level of the comparator 1511 inverts, and the counter-latch circuit 152 that latches a result of the counting.

Since the gain of the AMP 1510 is unity, the comparator 1511 outputs a high level when a level of the VRAMP is smaller than a level of the VAMP, and outputs a low level when the level of the VAMP is smaller than the level of the VRAMP. Thus, an output signal 155 (output signal of the comparator 1511) in FIG. 5A is low when a voltage level of the VAMP 154 is smaller than a voltage level of the VRAMP 153. With this configuration, a counter EN mask 158 in FIG. 5A outputs a high level in synchronization with a VRAMP ramp operation so as to operate the count-up counter until the output level of the comparison unit 151 inverts during the outputting. This converts a value proportional to the voltage level of the VAMP to a count value (digital value), thereby achieving an AD conversion operation. Reference numeral 156 in FIG. 5A denotes a counter operational duration (N-AD) in the N conversion.

Next, a level determination duration illustrated in FIG. 5A will be described. In this duration, the VRAMP is held at 1/N of a maximum output level of the VRAMP in an S conversion duration described later. At a determination timing T1, the level control unit 1512 acquires and stores the output level of the comparator 1511. In an example illustrated in FIG. 5A, since the level of the VRAMP is higher at the determination timing T1, the output level of the comparator 1511 is the low level. This level is acquired by the level control unit 1512 to set the output level of the level control unit 1512 to the low level. The gain of the AMP 1510 depends on the output level of the level control unit 1512, and hence is unity.

A basic operation in an S conversion duration (S level AD conversion duration) in FIG. 5A is the same as that in the N conversion duration. The comparator 1511 compares the output of the AMP 1510 and the ramp voltage (VRAMP). The row ADC 150 counts the time until the output level of the comparator 1511 inverts, and stores the time in the counter-latch circuit 152 (separately from data of the N conversion). The counter-latch circuit 152 stores the output level of the level control unit 1512. That is, the output level of the comparator 1511 at the determination timing T1 is stored. Thus, a control state of the AMP 1510 in the S conversion is stored. Reference numerals 156 and 157 in FIG. 5A denote durations (Ncnt duration, N-AD; and Scnt duration, S-AD) in which the counter counts proportionally to the N level and the S level.

Next, an operation illustrated in FIG. 5B will be described. An operation in the N conversion duration (the N level AD conversion duration) in FIG. 5B is the same as that in FIG. 5A. Ina level determination duration in FIG. 5B, which is different from that in FIG. 5A, the level of VRAMP is smaller than the level of the VAMP in the comparator 1511. Thus, at the determination timing T1, the output level of the comparator 1511 is the high level, and the level control unit 1512 stores the output level and outputs the high level. The gain of the AMP 1510, which depends on the output level of the level control unit 1512, is 1/N, for example.

In the S conversion duration (S level AD conversion duration) in FIG. 5B, the AMP 1510 has a gain of 1/N and thus has an output level of the VAMP×1/N, which is compared with the level of the VRAMP to perform the AD conversion. The counter-latch circuit 152 stores the output level of the level control unit 1512.

Figure 7A:
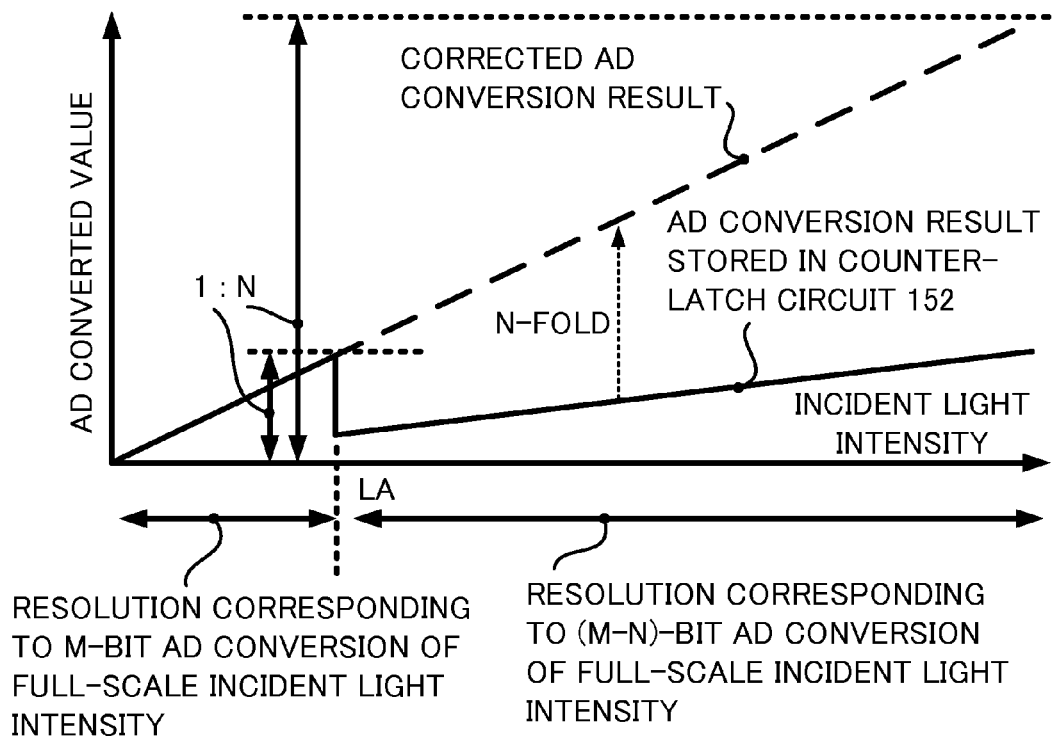
FIGS. 7A and 7B illustrate a relation between an incident light intensity and an AD converted value in Embodiment 1.

FIG. 7A illustrates a relation between the incident light intensity and an AD converted value. A solid line in FIG. 7A represents change of S converted data through the AD conversion operation in accordance with change of the incident light intensity of the pixel portion 110 (photodiode PD) in the AD conversion described above. In FIG. 7A, a horizontal axis represents the incident light intensity, and a vertical axis represents an AD converted digital code (AD converted value). The control state of the AMP 1510 at the S conversion is stored in the counter-latch circuit 152. When the AMP 1510 has a gain of 1/N in the S conversion, multiplying an S conversion result (X) stored in the counter-latch circuit 152 by a reciprocal of the gain 1/N of the AMP, that is N, yields a characteristic illustrated with a dotted line in FIG. 7A. This multiplication processing is provided by, for example, the signal processing circuit 170 at a later stage.

Figure 7B:
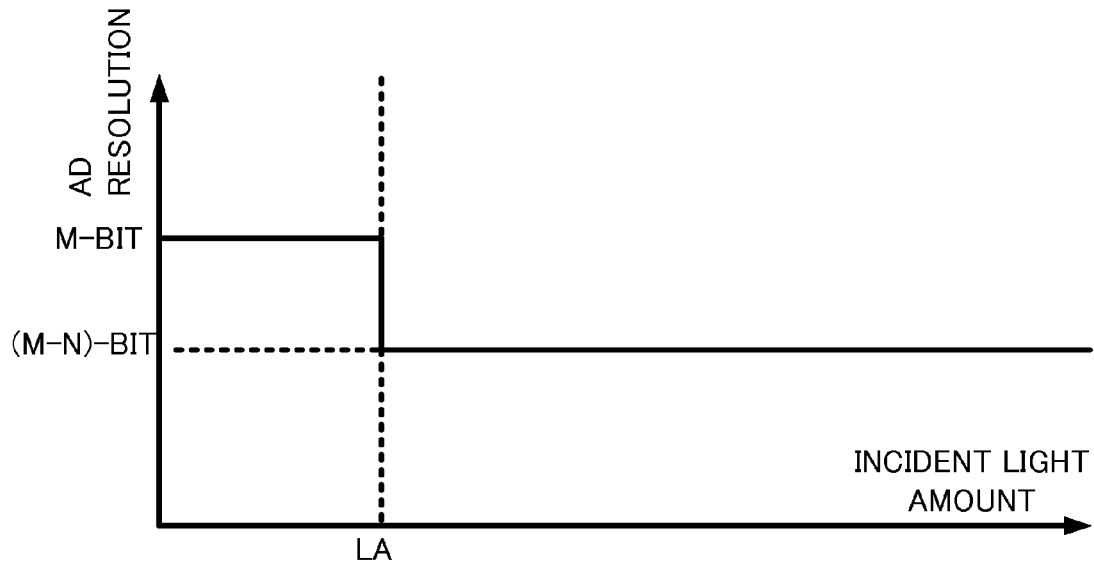

FIG. 7B illustrates a relation between the incident light intensity and an AD resolution. In FIG. 7B, a horizontal axis represents the incident light intensity of the pixel portion 110 (photodiode PD) in the AD conversion, and a vertical axis represents a bit resolution (the AD resolution) of an output AD code. When the incident light intensity of the photodiode PD is lower than a predetermined level (the incident light intensity LA), a digital conversion is performed at an M-bit resolution. On the other hand, when the incident light intensity of the photodiode is higher than the predetermined level (incident light intensity LA), the AD code has a coarser (lower) bit resolution of (M minus N) bits. This achieves speeding up of the AD conversion.

To simplify a description, as illustrated in FIG. 7B, the present embodiment employs two bit resolutions of M bits or (M minus N) bits depending on the incident light intensity, but is not limited thereto and may employ, a larger variety of bit resolutions. In that case, more determination levels may be provided in the level determination duration in FIG. 5 so as to perform multiple level determination.

The results of the AD conversion including the result of the AD conversion (N-AD) for the N level of a pixel and the result of the AD conversion (S-AD) for the S level of the pixel are stored in the counter-latch circuit 152. The horizontal transfer circuit 160 sequentially reads out AD results latched in the row ADC 150 including a plurality of ADCs and send them to the signal processing circuit 170. Cancelling of readout noise occurring in the image pickup apparatus 1 requires a correlation double sampling (CDS) operation and hence a calculation of (S-AD)−(N-AD). The signal processing circuit 170 calculates N×(S-AD)−(N-AD) when the AMP 1510 has again of 1/N in the S conversion. On the other hand, the signal processing circuit 170 calculates (S-AD)−(N-AD) when the AMP 1510 has a gain of unity in the S conversion.

Digitized image data facilitates, for example, a digital superposition of a particular offset so as to adjust a black level of an image, and a multiplication so as to provide a gain. The signal processing circuit 170 can also perform these pieces of signal processing. A signal processed through the signal processing circuit 170 is output to the external output circuit 180.

The slope of the VRAMP controls a conversion gain (the AD conversion gain) of the voltage and the digital code. Thus, a larger slope means that a VAMP output change has a lower sensitivity to one LSB of a digital value, and a smaller slope means that the VAMP output change has a higher sensitivity to one LSB of the digital value. This characteristic can be used in a gain calculation.

Next, a method of controlling the gain (1/N) of the AMP 1510 in the present embodiment will be described. It is well known that gamma processing is performed to efficiently reduce data volume when image data is recorded. For example, when RAW data from a sensor (the pixel portion 110) has a 16-bit resolution, the image processing LSI 2 performs various kinds of image processing, part of which involves the gamma processing of compressing the data to 10 bits for recording.

The gamma processing utilizes various gamma characteristics. Well-known gamma characteristics when a moving image is recorded include ITU-709 designed for optimal viewing on a TV monitor, and Cineon having characteristics close to those of a film camera. Some products allow a user to optionally adjust a gamma curve.

Figure 8A:
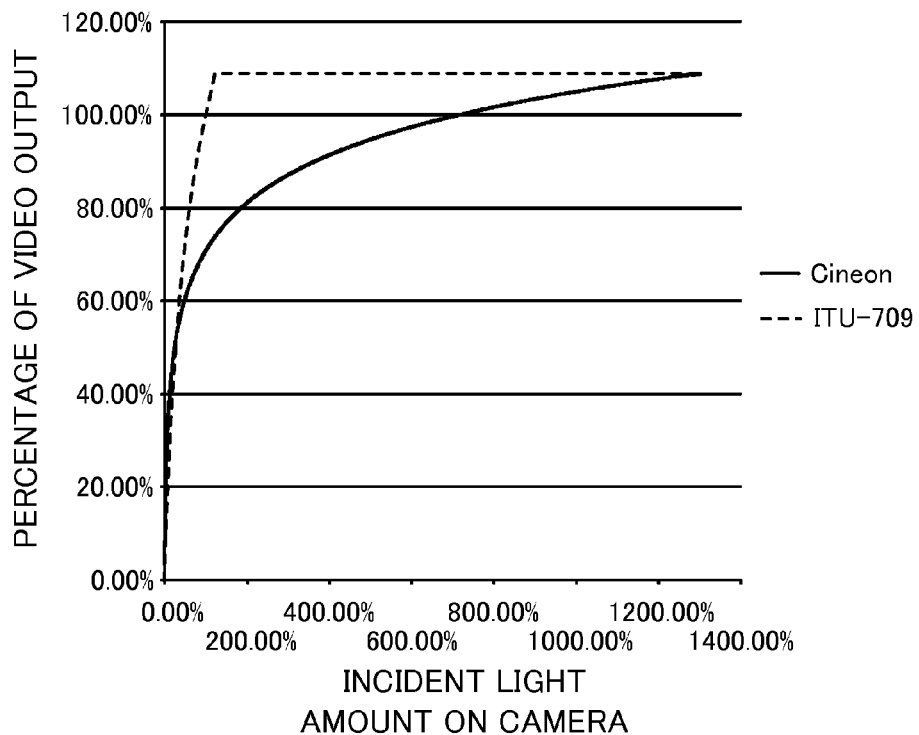
FIGS. 8A and 8B illustrate a gamma characteristic in Embodiment 1.
Figure 8B:
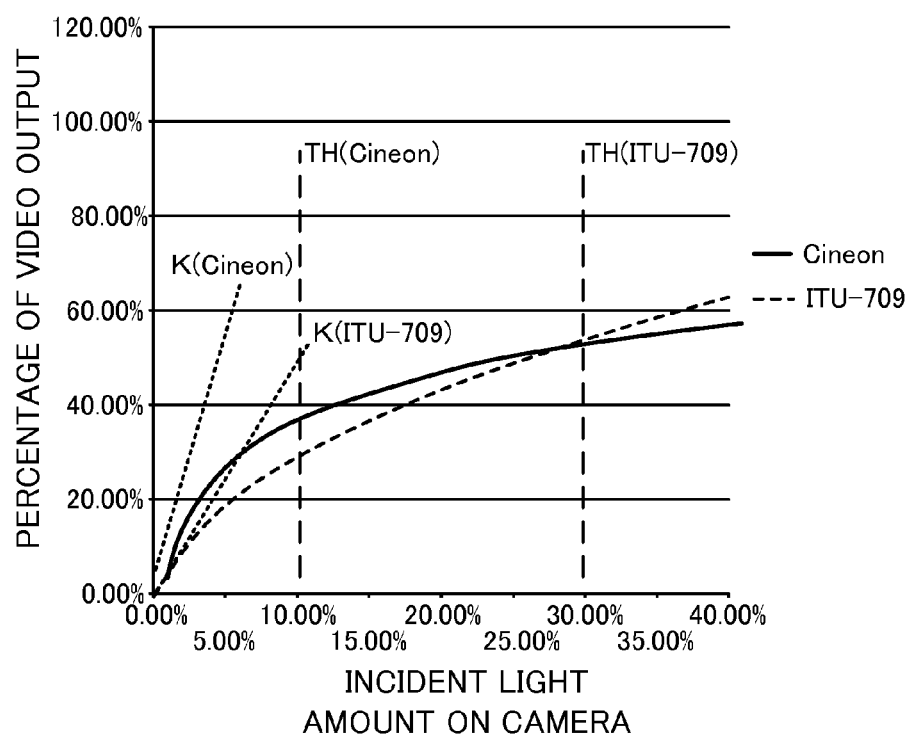

FIGS. 8A and 8B illustrate the gamma characteristics in the present embodiment. FIG. 8A illustrates input-output characteristics of ITU-709 and Cineon gamma. FIG. 8B illustrates the input-output characteristics of ITU-709 and Cineon gamma for low illumination intensities. In FIGS. 8A and 8B, a horizontal axis represents the incident light intensity on the image pickup apparatus 1, and a vertical axis represents a percentage of a video output.

K(Cineon) and K(ITU-709) illustrated in FIG. 8B are asymptotic lines of the gamma curves at low illumination intensities. At low illumination intensities, a gain of K(Cineon) is twice or more as large as a gain of K(ITU-709). This means that Cineon gamma requires twice or more as high bit accuracy as that of ITU-709 gamma for a sensor output. TH(Cineon) and TH (ITU-709) are thresholds (boundaries) at which the gains is substantially unity. For example, the sensor output needs to have a bit accuracy of M bits+α at incident light intensities lower than the thresholds TH for eventual recording in M bits.

In the present embodiment, the gain of the AMP 1510 is changed depending on the characteristics of the gamma curves. For example, when the gamma characteristic of Cineon is used at recording, the image pickup apparatus 1 is controlled such that the AMP 1510 has a loss of unity at light quantities lower than TH(Cineon). The image pickup apparatus 1 is controlled such that the AMP 1510 has a loss of 1/N (Cineon) at light quantities higher than TH(Cineon). On the other hand, when the gamma characteristic of ITU-709 is used at recording, the image pickup apparatus 1 is controlled such that the AMP 1510 has a loss of unity at light quantities lower than TH(ITU-709). The image pickup apparatus 1 is controlled such that the AMP 1510 has a loss of 1/N (ITU-709) at light quantities higher than TH (ITU-709). K (ITU-709) and K (Cineon) have gains different from each other. Thus, 1/N (Cineon) and 1/N (ITU-709) may be different from each other.

Although the above description is made of two gammas (gamma curves) of ITU-709 and Cineon, the present embodiment is not limited thereto and other gamma curves are also applicable. The use of a gamma curve is one of methods for efficient compressive image recording, and the image pickup apparatus 1 may be controlled depending on the other compression methods such as MPEG and JPEG.

As described above, in the present embodiment, the AD conversion gain of the row ADC 150 is controlled by the timing control unit 100 depending on the predetermined condition. The row ADC 150 preferably adjusts the AD conversion gain depending on an output level of the readout circuit of the pixel portion 110 so as to adjust a resolution of image data. The row ADC 150 more preferably outputs the image data at a first resolution (for example, M-bit resolution) when the output level of the readout circuit is lower than a threshold level (lower than the incident light intensity LA). On the other hand, the row ADC 150 outputs the image data at a second resolution (for example, (M−N)-bit resolution) lower (coarser) than the first resolution when the output level of the readout circuit is higher than the threshold level. The timing control unit 100 changes the threshold level depending on the predetermined condition.

The timing control unit 100 preferably changes the threshold level depending on an image compression method at recording of the image data as the predetermined condition. The timing control unit 100 more preferably changes the threshold level depending on the gamma characteristic as the predetermined condition.

The ramp circuit 140 included in the image pickup apparatus 1 preferably generates a ramp signal having a constant slope. The row ADC 150 includes the AMP (amplifier) 1510 that amplifies a signal from the readout circuit, and compares the ramp signal and an output level of the AMP 1510 for the AD conversion. The timing control unit 100 changes a variable gain of the AMP 1510 depending on the predetermined condition so as to control the AD conversion gain of the row ADC 150. Instead, the timing control unit 100 may control, depending on the predetermined condition, a slope of a ramp signal through the ramp circuit that generates the ramp signal so as to control the AD conversion gain of the row ADC 150.

The present embodiment can provide an image pickup apparatus and an image pickup system that are fast and have low power consumption.

Embodiment 2

Next, an image pickup apparatus in Embodiment 2 of the present invention will be described. In the present embodiment, the gain (attenuation rate) of the AMP 1510 is changed depending on a frame rate (capturing frame rate) of the image pickup apparatus 1. The present embodiment applies a different method of controlling the image pickup apparatus 1, and has the same configuration of the image pickup apparatus 1 as that in Embodiment 1.

Figure 9:
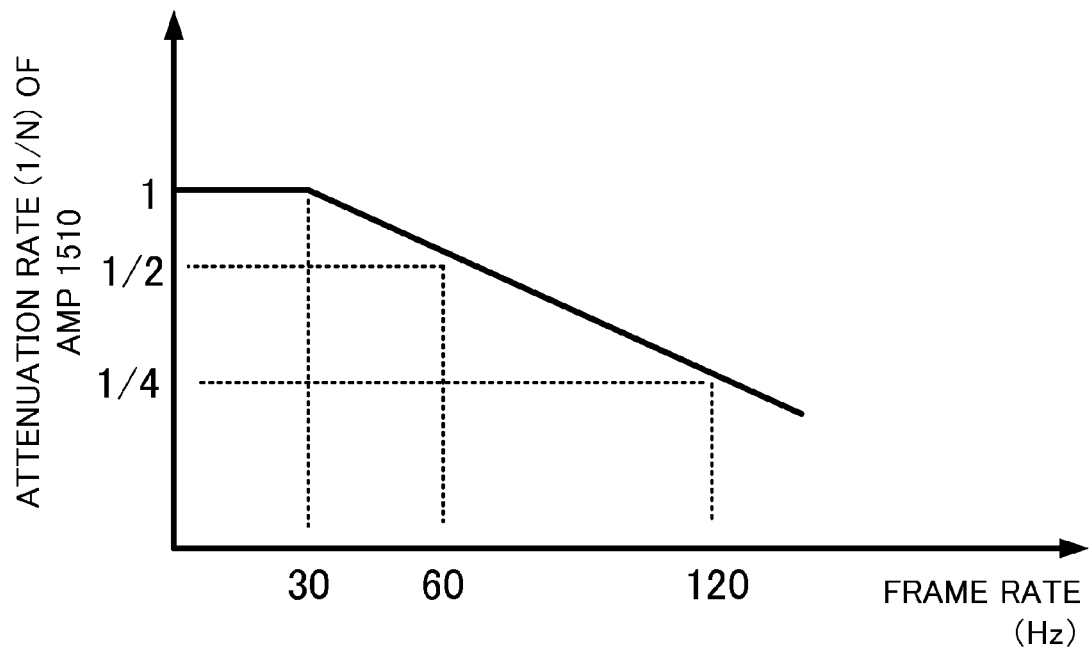
FIG. 9 illustrates a relation between a frame rate of an image pickup apparatus and an attenuation rate of a comparison unit (AMP 1510) in Embodiment 2.

Referring to FIG. 9, the method of controlling the image pickup apparatus 1 in the present embodiment will be described. FIG. 9 illustrates a relation between the frame rate of the image pickup apparatus and the attenuation rate of the comparison unit 151 (AMP 1510). As illustrated in FIG. 9, a lower frame rate means a longer time available for pixel readout. In FIG. 9, an operation of the image pickup apparatus at 30 Hz or lower leads to N=1 for the gain 1/N of the AMP 1510. An operation of the image pickup apparatus at 60 Hz leads to N=2, and an operation of the image pickup apparatus at 120 Hz leads to N=4. The gain 1/N (attenuation rate) of the AMP 1510 is changed in this manner.

In the present embodiment, the timing control unit 100 changes a threshold level (threshold level of an output signal from the readout circuit) depending on the frame rate of the image pickup apparatus 1 as the predetermined condition. The present embodiment can thus provide an image pickup apparatus and an image pickup system that are fast and have low power consumption.

Embodiment 3

Next, an image pickup apparatus in Embodiment 3 of the present invention will be described. In the present embodiment, the gain (attenuation rate) of the AMP 1510 is changed depending on the temperature inside the camera (image pickup system). The present embodiment applies a different method of controlling the image pickup apparatus 1, and has the same configuration of the image pickup apparatus 1 as that in Embodiment 1.

Figure 10:
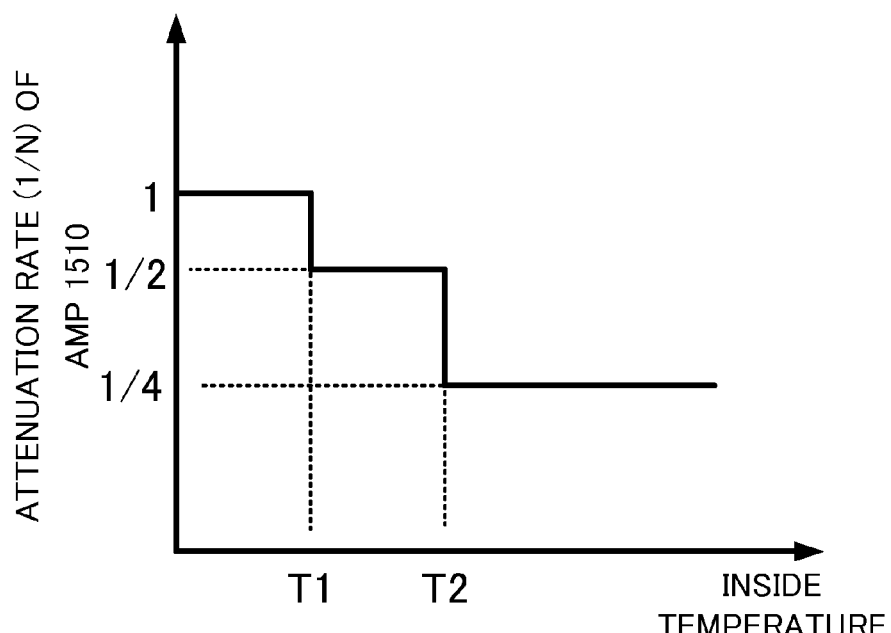
FIG. 10 illustrates a relation between a temperature inside a camera and the attenuation rate of the comparison unit (AMP 1510) in Embodiment 3.

Referring to FIG. 10, the method of controlling the image pickup apparatus 1 in the present embodiment will be described. FIG. 10 illustrates a relation between the temperature inside the camera and the attenuation rate of the comparison unit 151 (the AMP 1510). When the temperature inside the camera reaches at a predetermined temperature (for example, temperatures T1 and T2 in FIG. 10), the gain 1/N of the AMP 1510 is controlled. This can reduce an increase in the temperature inside the camera.

In the present embodiment, the timing control unit 100 changes the threshold level (threshold level of the output signal from the readout circuit) depending on temperature (the temperature inside the camera) as the predetermined condition. The present embodiment can thus provide an image pickup apparatus and an image pickup system that are fast and have low power consumption.

Embodiment 4

Next, an image pickup apparatus in Embodiment 4 of the present invention will be described. In the present embodiment, the gain (attenuation rate) of the AMP 1510 is changed depending on the operation mode of the camera (image pickup system). The present embodiment applies a different method of controlling the image pickup apparatus 1, and has the same configuration of the image pickup apparatus 1 as that in Embodiment 1.

Figure 11:
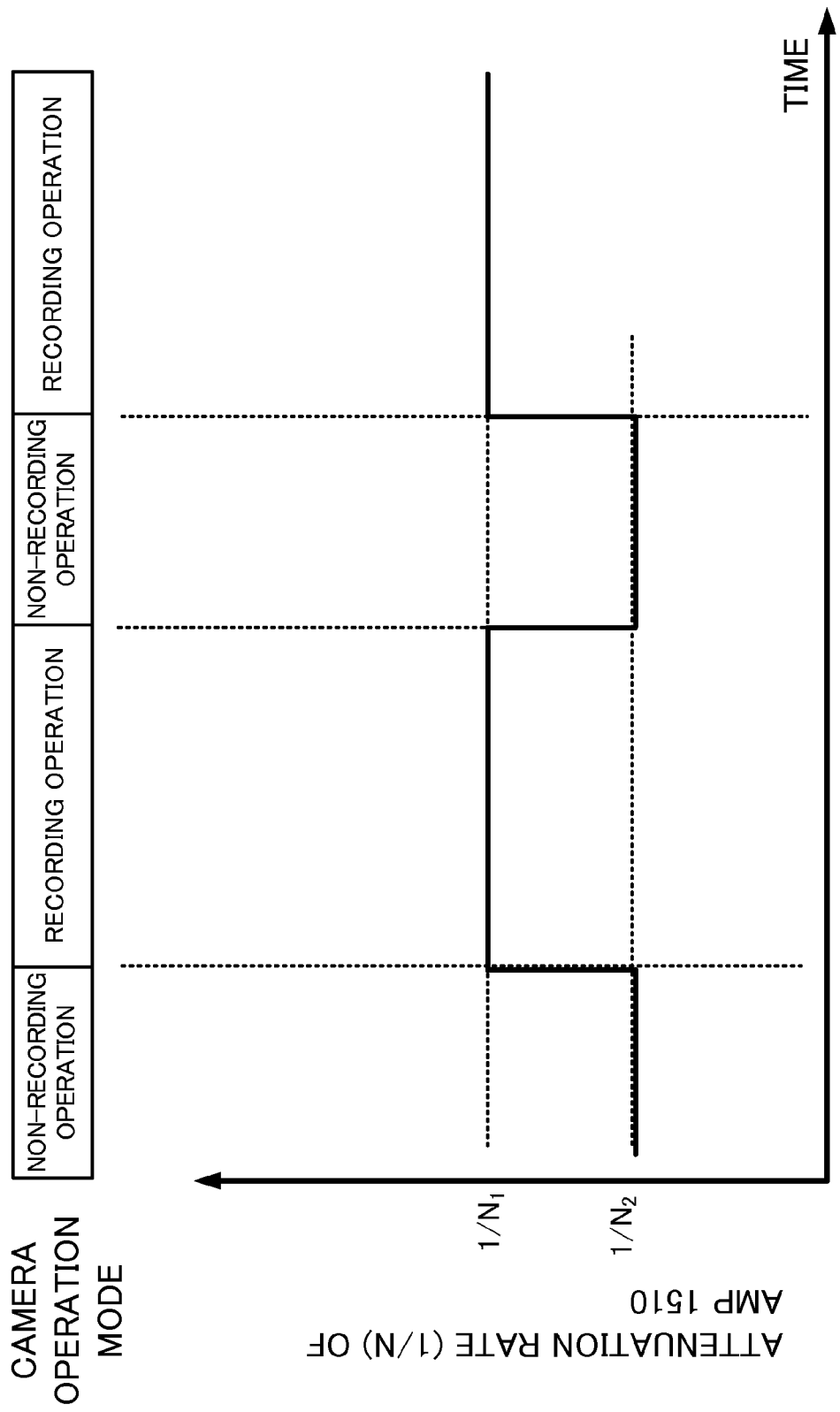
FIG. 11 illustrates a relation between an operation mode of the camera and the attenuation rate of the comparison unit (AMP 1510) in Embodiment 4.

Referring to FIG. 11, the method of controlling the image pickup apparatus 1 in the present embodiment will be described. FIG. 11 illustrates a relation between the operation mode of the camera and the attenuation rate of the comparison unit 151 (AMP 1510). The operation mode includes a non-recording operation mode and a recording operation mode.

First, a case in which the camera is not performing a recording operation (in the non-recording operation mode) will be described. In such a case, for example, a view angle is being checked or a focus adjustment is being performed through a panel built in the camera. Typically, a bit resolution per pixel of the panel built in the camera is likely to be lower than that of an image to be recorded, and the number of pixels displayable on the panel is likely to be smaller. For this reason, when the camera is not performing the recording operation, the image pickup apparatus 1 may output a low bit resolution image. Thus, as illustrated in FIG. 11, depending on whether the camera is not performing the recording operation (in the non-recording operation mode) or is performing the recording operation (in the recording operation mode), the gain 1/N of the AMP 1510 is switched. In FIG. 11, N1 and N2 are set to satisfy N1<N2.

In the present embodiment, the timing control unit 100 changes the threshold level (threshold level of the output signal from the readout circuit) depending on an image capturing mode as the predetermined condition. The timing control unit 100 preferably changes the threshold level depending on, as the predetermined condition, whether a recording operation of image data is being performed. The present embodiment can thus provide an image pickup apparatus and an image pickup system that are fast and have low power consumption.

Embodiment 5

Next, an image pickup apparatus in Embodiment 5 of the present invention will be described. In Embodiments 1 to 4, the AMP 1510 as the comparison unit 151 amplifies a level of the readout signal VAMP from a pixel. On the other hand, in the present embodiment, as illustrated in FIG. 12, the AMP 1510 amplifies a level of the ramp voltage (VRAMP) generated by the ramp circuit 140.

Figure 12:
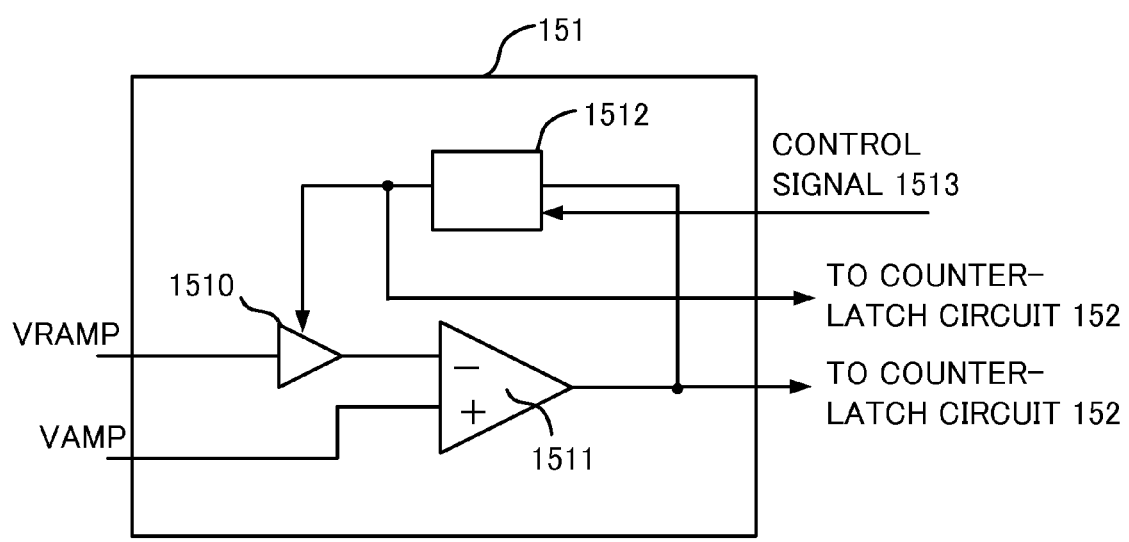
FIG. 12 is a circuit configuration diagram of the comparison unit in Embodiment 5.

FIG. 12 is a circuit configuration diagram of the comparison unit 151 in the present embodiment. As illustrated in FIG. 12, in the comparison unit 151 in the present embodiment, the VAMP is direct input to the comparator 1511, and the VRAMP is amplified by the AMP 1510 before being input to the comparator 1511.

Figure 13A:
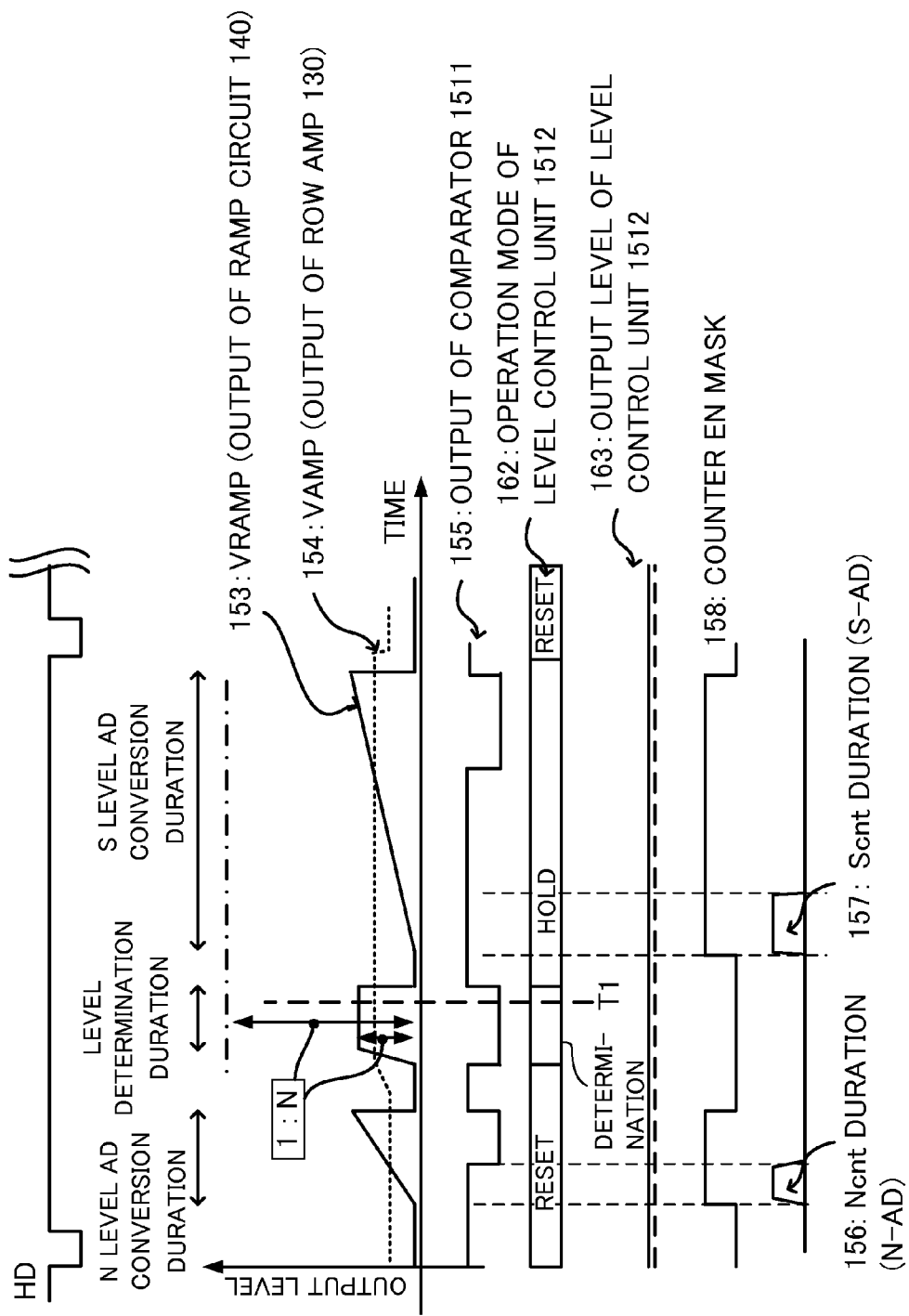
FIG. 13A illustrates an operation of the row ADC in Embodiment 5.
Figure 13B:
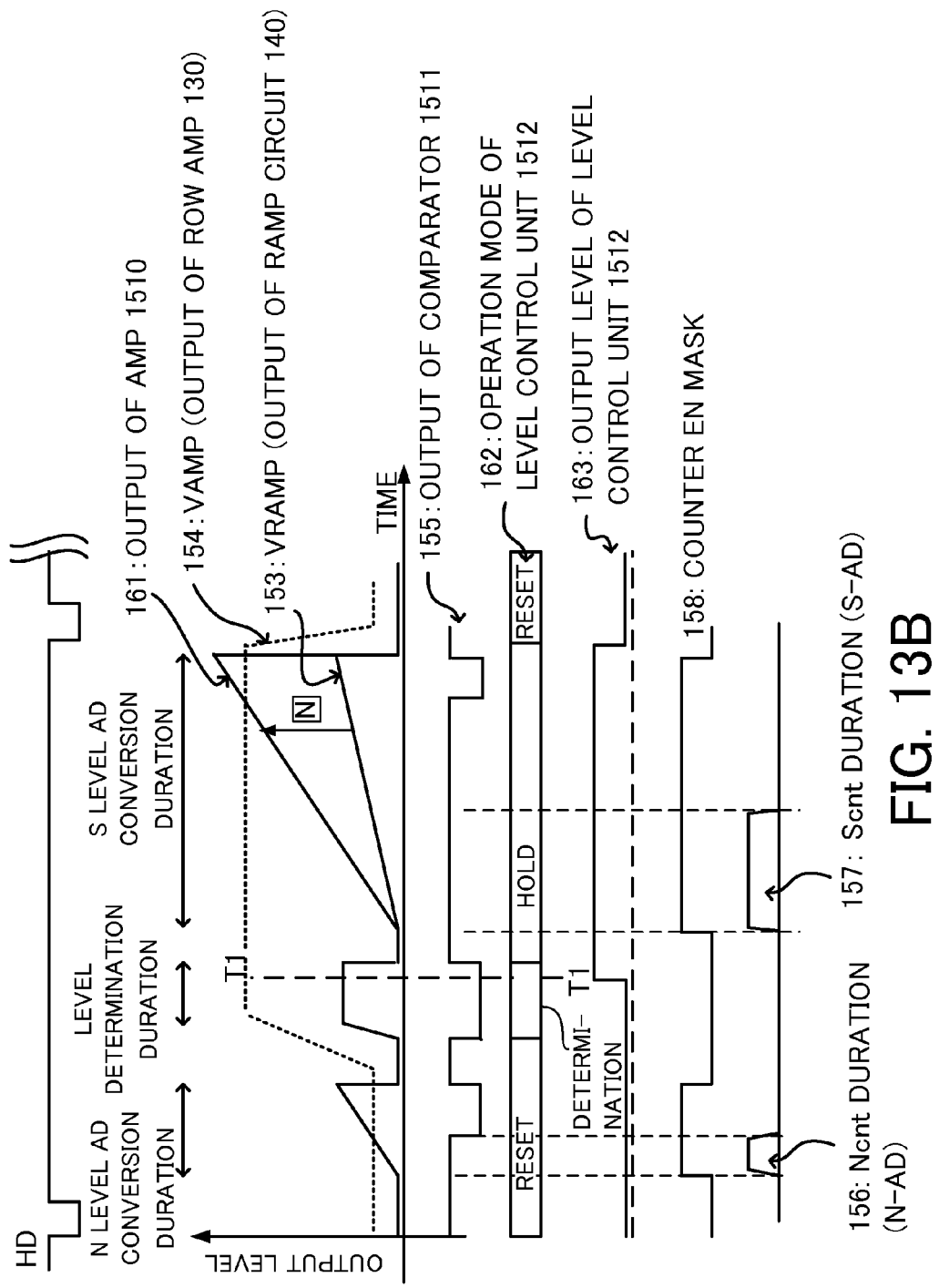
FIG. 13B illustrates the operation of the row ADC in Embodiment 5.

FIGS. 13A and 13B illustrates a temporal flow of an operation of the row ADC 150 when the comparison unit 151 having the configuration in FIG. 12 is used. The configuration of the comparison unit 151 and the operation in the N conversion (the N level AD conversion duration) are the same as those in Embodiment 1, and thus a description thereof will be omitted.

In the level determination (level determination duration), the AMP 1510 has a gain of unity, and the level of the VRAMP is input to the comparator 1511 without amplification. The level of the VAMP and the output level of the AMP 1510 are compared. When the output level of the AMP 1510 is smaller, the gain of the AMP 1510 in the S level AD conversion duration is held at unity and the AD conversion is performed as illustrated in FIG. 13A. This operation is the same as that illustrated in FIG. 5A in Embodiment 1.

On the other hand, in the level determination, when the comparison between the level of the VAMP and the output level of the AMP 1510 by the comparator 1511 shows that the output level of the AMP 1510 is larger, the gain of the AMP 1510 in the S level AD conversion duration is set to be N. FIG. 13B illustrates this operation. In FIG. 13B, an output 161 of the AMP 1510 is provided with N-fold amplification of an output 153 (the VRAMP) of the ramp circuit in FIG. 13B. Operations after the level comparison by the comparator 1511 are the same as those in Embodiment 1, and thus a description thereof will be omitted.

The image pickup apparatus according to each of the embodiments achieves maintaining the number of bits required for an image read out from the image pickup apparatus, reducing power consumption, shortening time required for the AD conversion, and efficiently reading out pixel data. Each of the embodiments can thus provide an image pickup apparatus and an image pickup system that are fast and have low power consumption.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-262477, filed on Dec. 19, 2013, which is hereby incorporated by reference herein in its entirety.

What is claimed is:

1. An image pickup apparatus comprising:
a plurality of pixels;
a readout circuit configured to read out pixel signals from the pixels;
an AD converter configured to provide the pixel signals with an AD conversion so as to output image data; and
a controller configured to control the AD converter so that the AD converter outputs the image data at a first resolution in a case where the pixel signals are not higher than a threshold level, and outputs the image data at a second resolution lower than the first resolution in a case where the pixel signals are higher than the threshold level,
wherein the controller changes the threshold level depending on a predetermined condition.

2. The image pickup apparatus according to claim 1, wherein the controller adjusts an AD conversion gain of the AD converter so as to adjust a resolution of the image data.

3. The image pickup apparatus according to claim 2, further comprising a signal generating unit configured to generate a ramp signal having a constant slope,
wherein the AD converter (a) includes an amplifier configured to amplify the pixel signals and (b) compares the ramp signal and an output level of the amplifier for the AD conversion, and
wherein the controller changes a gain of the amplifier depending on the predetermined condition so as to adjust the AD conversion gain of the AD converter.

4. The image pickup apparatus according to claim 2, further comprising a signal generating unit configured to generate a ramp signal having a slope,
wherein the AD converter (a) includes an amplifier configured to amplify the pixel signals and (b) compares the ramp signal and an output level of the amplifier for the AD conversion, and
wherein the controller controls the slope of the ramp signal depending on the predetermined condition so as to adjust the AD conversion gain of the AD converter.

5. The image pickup apparatus according to claim 1, wherein the controller changes the threshold level depending on an image compression method for recording the image data.

6. The image pickup apparatus according to claim 1, wherein the controller changes the threshold level depending on a gamma characteristic.

7. The image pickup apparatus according to claim 1, wherein the controller changes the threshold level depending on a frame rate of the image pickup apparatus.

8. The image pickup apparatus according to claim 1, wherein the controller changes the threshold level depending on temperature.

9. The image pickup apparatus according to claim 1, wherein the controller changes the threshold level depending on an image capturing mode.

10. The image pickup apparatus according to claim 1, wherein the controller changes the threshold level depending on whether a recording operation of the image data is being performed.

11. An image pickup system comprising:
an image pickup apparatus; and
an image processing apparatus configured to control the image pickup apparatus,
wherein the image pickup apparatus includes:
(1) a plurality of pixels;
(2) a readout circuit configured to read out pixel signals from the pixels;
(3) an AD converter configured to provide the pixel signals with an AD conversion so as to output image data; and
(4) a controller configured to control the AD converter so that the AD converter outputs the image data at a first resolution in a case where the pixel signals are not higher than a threshold level, and outputs the image data at a second resolution lower than the first resolution in a case where the pixel signals are higher than the threshold level,
wherein the controller changes the threshold level depending on a predetermined condition.

* * * * *